US007441543B2

(12) United States Patent
Yoshihara et al.

(10) Patent No.: US 7,441,543 B2
(45) Date of Patent: Oct. 28, 2008

(54) DEVICE AND METHOD FOR CONTROLLING IGNITION TIMING OF INTERNAL COMBUSTION ENGINE

(75) Inventors: Masatomo Yoshihara, Toyota (JP); Kenji Kasashima, Nishikamo-gun (JP); Rihito Kaneko, Nishikamo-gun (JP); Kenji Senda, Okazaki (JP); Yuuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 0 days.

(21) Appl. No.: 11/762,448

(22) Filed: Jun. 13, 2007

(65) Prior Publication Data
US 2007/0289575 A1    Dec. 20, 2007

(30) Foreign Application Priority Data
Jun. 16, 2006   (JP)  .............................. 2006-167726

(51) Int. Cl.
*F02P 5/152* (2006.01)
(52) U.S. Cl. ................................. 123/406.38
(58) Field of Classification Search ............ 123/406.29, 123/406.33, 406.34, 406.37, 406.38, 435; 701/11; 73/35.04, 35.06, 35.07, 35.09
See application file for complete search history.

(56) References Cited

U.S. PATENT DOCUMENTS

| | | | | | |
|---|---|---|---|---|---|
| 4,269,155 | A | * | 5/1981 | Iwata et al. ............ | 123/406.39 |
| 4,345,558 | A | * | 8/1982 | Yamaguchi et al. .... | 123/406.35 |
| 6,688,286 | B2 | * | 2/2004 | Kokubo et al. ......... | 123/406.33 |
| 6,748,922 | B2 | * | 6/2004 | Uchida et al. .......... | 123/406.38 |
| 7,043,353 | B2 | * | 5/2006 | Takemura et al. ........... | 701/111 |
| 7,181,338 | B2 | * | 2/2007 | Takemura et al. ........... | 701/111 |
| 7,281,516 | B2 | * | 10/2007 | Kaneko et al. ......... | 123/406.38 |
| 2007/0084266 | A1 | * | 4/2007 | Kaneko et al. ............. | 73/35.03 |
| 2007/0214869 | A1 | * | 9/2007 | Kaneko et al. ............. | 73/35.09 |
| 2007/0215109 | A1 | * | 9/2007 | Kaneko et al. ......... | 123/406.34 |

FOREIGN PATENT DOCUMENTS

| | | |
|---|---|---|
| JP | 61-14472 | 1/1986 |
| JP | 4-76249 | 3/1992 |
| JP | 2003-21032 | 1/2003 |

(Continued)

*Primary Examiner*—Hai H Huynh
(74) *Attorney, Agent, or Firm*—Oblon, Spivak, McClelland, Maier & Neustadt, P.C.

(57) ABSTRACT

An engine ECU executes a program including a step of calculating a correlation coefficient K representing a degree of agreement between a vibration waveform and a knock waveform model, a step of calculating a knock magnitude N by dividing a peak value P of magnitude in the vibration waveform by BGL, a step of determining whether knocking has occurred based on a combination of the correlation coefficient K and the knock magnitude N, in such a manner as to determine that knocking has not occurred in at least one of the case where the correlation coefficient K is smaller than a threshold value K(1) and the case where the knock magnitude N is smaller than a threshold value N(1), and a step of retarding ignition timing by a retarding amount corresponding to the combination of the correlation coefficient K and the knock magnitude N, if knocking has occurred.

15 Claims, 8 Drawing Sheets

FOREIGN PATENT DOCUMENTS

| | | |
|---|---|---|
| JP | 2004-353531 | 12/2004 |
| JP | 2005-23902 | 1/2005 |
| JP | 2005-282382 | 10/2005 |
| JP | 2005-307753 | 11/2005 |
| JP | 2005-330954 | 12/2005 |
| JP | 2006-22648 | 1/2006 |
| JP | 2007-9735 | 1/2007 |

* cited by examiner

| | NOISE | KNOCKING (LOW LEVEL) | KNOCKING (MEDIUM LEVEL) | KNOCKING (HIGH LEVEL) |
|---|---|---|---|---|
| | NOISE | NOISE | KNOCKING (LOW LEVEL) | KNOCKING (MEDIUM LEVEL) |
| | NOISE | NOISE | NOISE | NOISE |

CORRELATION COEFFICIENT K, with thresholds K(2) and K(1) on vertical axis; KNOCK MAGNITUDE N with thresholds N(1), N(2), N(3) on horizontal axis.

DEVICE AND METHOD FOR CONTROLLING IGNITION TIMING OF INTERNAL COMBUSTION ENGINE

This nonprovisional application is based on Japanese Patent Application No. 2006-167726 filed with the Japan Patent Office on Jun. 16, 2006, the entire contents of which are hereby incorporated by reference.

BACKGROUND OF THE INVENTION

1. Field of the Invention

The present invention relates to a device and a method for controlling ignition timing of an internal combustion engine, and particularly relates to a technique of determining whether knocking is present or absent based on a waveform of vibration and magnitude of vibration of the internal combustion engine and retarding ignition timing in accordance with a determination result.

2. Description of the Background Art

Conventionally, various methods of detecting knocking (knock) generated in an internal combustion engine have been proposed. For example, there is a technique of determining occurrence of knocking if magnitude of vibration of an internal combustion engine is greater than a threshold value. However, even if knocking has not occurred, there may be a case where magnitude of noise such as vibration generated when an intake valve or an exhaust valve is closed, for example, is greater than the threshold value. In this case, it may erroneously be determined that knocking has occurred even though knocking has not occurred. Accordingly, there has been proposed a technique of determining whether knocking is present or absent based on a waveform of vibration so as to consider properties other than the magnitude, such as a crank angle at which vibration is generated and a damping rate.

Japanese Patent Laying-Open No. 2005-330954 discloses a device for determining knocking of an internal combustion engine, which device precisely determines whether or not knocking has occurred by using a waveform of vibration. The device for determining knocking described in Japanese Patent Laying-Open No. 2005-330954 includes a crank angle detection unit for detecting a crank angle of an internal combustion engine, a vibration detection unit for detecting a value related to magnitude of vibration of the internal combustion engine, a waveform detection unit for detecting a waveform of the vibration of the internal combustion engine between predetermined crank angles, based on the value related to the magnitude of the vibration, a storage unit for storing in advance a waveform of vibration of the internal combustion engine, and a determination unit for determining whether or not knocking has occurred in the internal combustion engine based on a result of comparison between the detected waveform and the stored waveform. The determination unit determines whether or not knocking has occurred based on whether or not knock magnitude, which is a product of a value representing a deviation of the detected waveform and the stored waveform from each other and a value representing the magnitude of the vibration, is greater than a determination value.

According to the device for determining knocking described in this publication, the crank angle detection unit detects a crank angle of the internal combustion engine, the vibration detection unit detects a value related to magnitude of vibration, and the waveform detection unit detects a waveform of the vibration of the internal combustion engine between predetermined crank angles, based on the value related to the magnitude of the vibration. The storage unit stores in advance a waveform of vibration of the internal combustion engine, and the determination unit determines whether or not knocking has occurred in the internal combustion engine based on a result of comparison between the detected waveform and the stored waveform. Accordingly, it is possible to form and store in advance a knock waveform model, which is a waveform of vibration when knocking is generated by experiment, for example, and compare this knock waveform model and the detected waveform to thereby determine whether or not knocking has occurred. Therefore, it becomes possible to analyze in more detail whether or not the vibration of the engine is caused by knocking. Furthermore, it is determined whether or not knocking has occurred based on magnitude of the vibration as well as the waveform of the vibration. Consequently, it becomes possible to precisely determine whether or not knocking has occurred.

However, the device for determining knocking described in Japanese Patent Laying-Open No. 2005-330954 uses a product of the value representing a deviation of the waveforms from each other and the value representing magnitude of the vibration, and hence if the magnitude is significantly great while the waveforms differ from each other, erroneous determination that knocking has occurred may be made even though knocking has not occurred. In this case, there arises a problem of excessive implementation of ignition timing retard, which is to be implemented at the time of knocking.

SUMMARY OF THE INVENTION

An object of the present invention is to provide a device and the like for controlling ignition timing of an internal combustion engine that can suppresses excessive retarding of ignition timing.

A device for controlling ignition timing of an internal combustion engine according to an aspect of the present invention includes: a crank position sensor detecting a crank angle of the internal combustion engine; and an operation unit. The operation unit detects a waveform of vibration of the internal combustion engine in a predetermined range of the crank angle. The operation unit calculates a first value representing a degree of agreement between the detected waveform and a waveform model set as a reference of the waveform of the vibration of the internal combustion engine. The operation unit calculates a second value representing magnitude of the vibration generated in the internal combustion engine. The operation unit determines whether or not knocking has occurred in the internal combustion engine based on a combination of the first value and the second value, in such a manner as to determine that knocking has not occurred in at least one of a case where the first value satisfies a first condition and a case where the second value satisfies a second condition. If the operation unit determines that knocking has occurred in the internal combustion engine, the operation unit controls the internal combustion engine such that the ignition timing is retarded by an amount corresponding to the combination of the first value and the second value.

According to the configuration, a crank angle of the internal combustion engine is detected. A waveform of vibration of the internal combustion engine in a predetermined range of the crank angle is detected. A first value representing a degree of agreement between the waveform and a waveform model is calculated. Furthermore, a second value representing magnitude of the vibration generated in the internal combustion engine is calculated. Based on a combination of the first value and the second value, it is determined whether or not knocking has occurred in the internal combustion engine. There exists a case where the magnitude of the vibration may be equivalent to magnitude at the time of knocking even though the waveform of the vibration of the internal combustion engine is not similar to the waveform model. There also exists a case where the waveform of the vibration of the internal combustion engine may be similar to the waveform model even though the magnitude of the vibration is small. In any of these cases, it can be concluded that knocking has not occurred. Accordingly, it is determined that knocking has not occurred in at least one of the case where the first value satisfies a first condition and the case where the second value satisfies a second condition. For example, it is determined that knocking has not occurred in at least one of the case where a condition that the first value is smaller than a first threshold value is satisfied, and the case where a condition that the second value is smaller than a second threshold value is satisfied. It becomes thereby possible to reduce erroneous determination that knocking has occurred while knocking has not occurred. Accordingly, it becomes possible to suppress erroneous implementation of ignition timing retard, which should be implemented at the time of knocking. Consequently, excessive retarding of ignition timing can be suppressed. Furthermore, if it is determined that knocking has occurred, the internal combustion engine is controlled such that the ignition timing is retarded by an amount corresponding to a combination of the first value and the second value. For example, the ignition timing is retarded by a smaller amount as the first value becomes smaller, or the ignition timing is retarded by a smaller amount as the second value becomes smaller. It becomes thereby possible to minutely set a retarding amount of ignition timing at the time of knocking. Accordingly, it becomes possible to provide a device for controlling ignition timing of the internal combustion engine that can suppresses excessive retarding of the ignition timing.

Preferably, the operation unit calculates the second value by dividing a maximum value of the magnitude of the vibration in the predetermined range by a value set as a reference of the magnitude of the vibration of the internal combustion engine.

According to the configuration, a maximum value of the magnitude of the vibration in the predetermined range is divided by a value set as a reference of the magnitude of the vibration of the internal combustion engine to thereby calculate the second value. It becomes thereby possible to precisely determine whether or not knocking has occurred by using the maximum value of the magnitude, which may significantly be different between the case where knocking has occurred and the case where knocking has not occurred. Accordingly, it becomes possible to precisely determine whether or not knocking has occurred.

More preferably, the first condition is a condition that the first value is smaller than a first threshold value, and the second condition is a condition that the second value is smaller than a second threshold value.

According to the configuration, it is determined that knocking has not occurred in at least one of the case where the condition that the first value is smaller than the first threshold value is satisfied and the case where the condition that the second value is smaller than the second threshold value is satisfied. In other words, it is determined that knocking has not occurred in at least one of the case where the detected waveform is considered not to be similar to the waveform model, and the case where the magnitude of the vibration is considered to be small. Accordingly, it becomes possible to reduce erroneous determination that knocking has occurred while knocking has not occurred.

More preferably, the operation unit controls the internal combustion engine such that the ignition timing is retarded by a smaller amount as the first value becomes smaller.

According to the configuration, the ignition timing is retarded by a smaller amount as the first value becomes smaller. In other words, the ignition timing is retarded by a smaller amount as the degree of agreement between the detected waveform and the waveform model becomes lower. It becomes thereby possible to minutely set a retarding amount of the ignition timing at the time of knocking. Accordingly, excessive retarding of the ignition timing can be suppressed.

More preferably, the operation unit controls the internal combustion engine such that the ignition timing is retarded by a smaller amount as the second value becomes smaller.

According to the configuration, the ignition timing is retarded by a smaller amount as the second value becomes smaller. In other words, the ignition timing is retarded by a smaller amount as the magnitude of the vibration becomes smaller. It becomes thereby possible to minutely set a retarding amount of the ignition timing at the time of knocking. Accordingly, excessive retarding of the ignition timing can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below with reference to the drawings. In the following description, the same parts are provided with the same reference characters. They have the same names and functions. Therefore, detailed description thereof will not be repeated.

Figure 1:
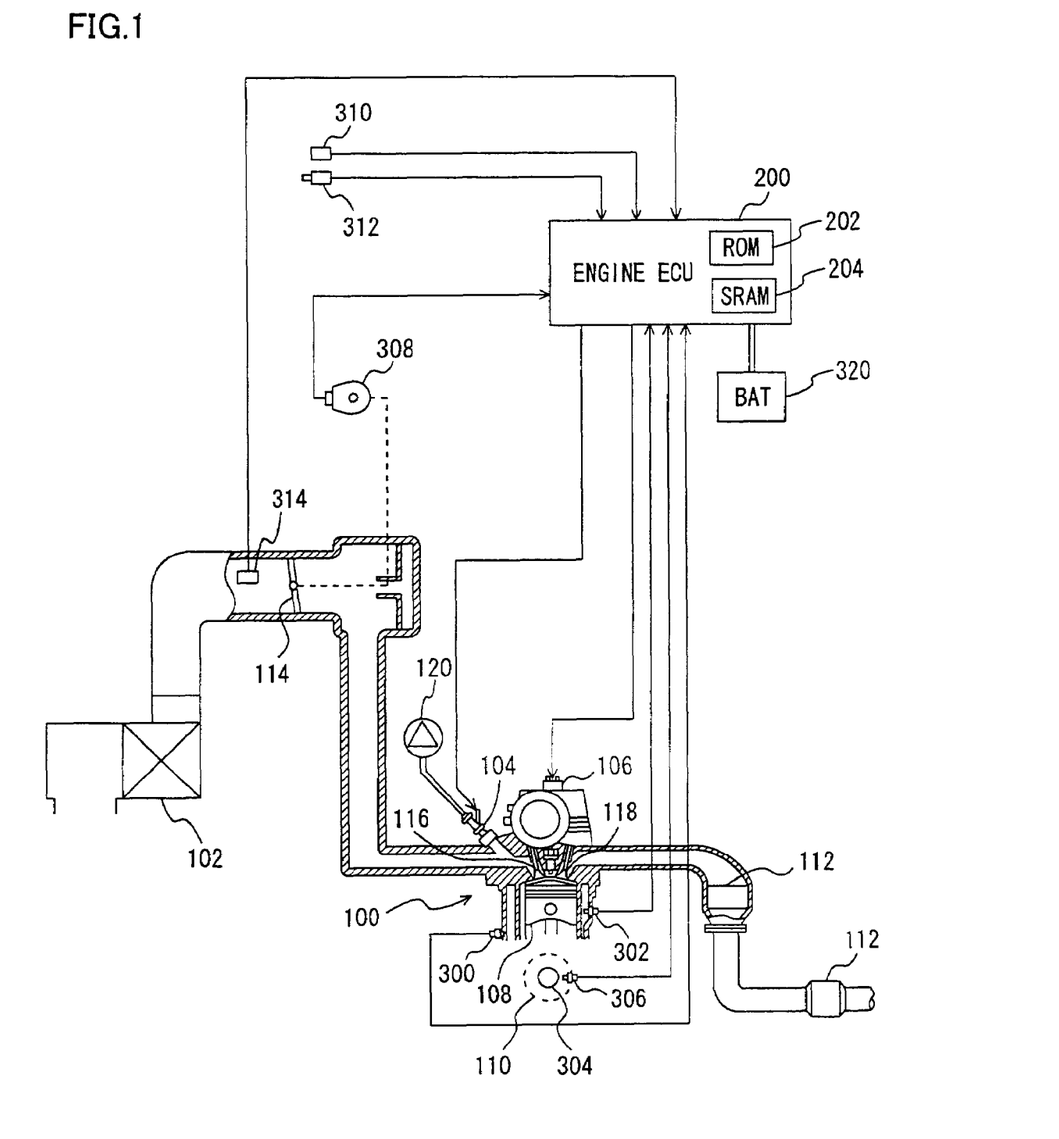
FIG. 1 is a schematic configuration diagram of an engine controlled by an engine ECU identified as a device for controlling ignition timing according to an embodiment of the present invention.

With reference to FIG. 1, an engine 100 of a vehicle mounted with a device for controlling ignition timing according to the embodiment of the present invention will be described. Engine 100 is provided with a plurality of cylinders. The device for controlling ignition timing according to the present embodiment is accomplished by, for example, a program executed by an engine ECU (Electronic Control Unit) 200.

Engine 100 is an internal combustion engine in which an air-fuel mixture of air drawn in from an air cleaner 102 and fuel injected from an injector 104 is ignited by a spark plug 106 and burnt in a combustion chamber. Ignition timing is controlled to be MBT (Minimum advance for Best Torque) at which output torque becomes a maximum, but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a vehicle. An amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects an amount of air drawn into engine 100 and sends a signal representing a detection result to engine ECU 200.

Engine ECU 200 operates by electric power supplied from an auxiliary battery 320 serving as a power supply. Engine ECU 200 performs operation based on signals sent from the respective sensors and ignition switch 312 and a map and a program stored in ROM (Read Only Memory) 202 or SRAM (Static Random Access Memory) 204 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the present embodiment is from a top dead center (0°) to 90° in a combustion stroke. Note that the knock detection gate is not limited thereto.

Figure 2:
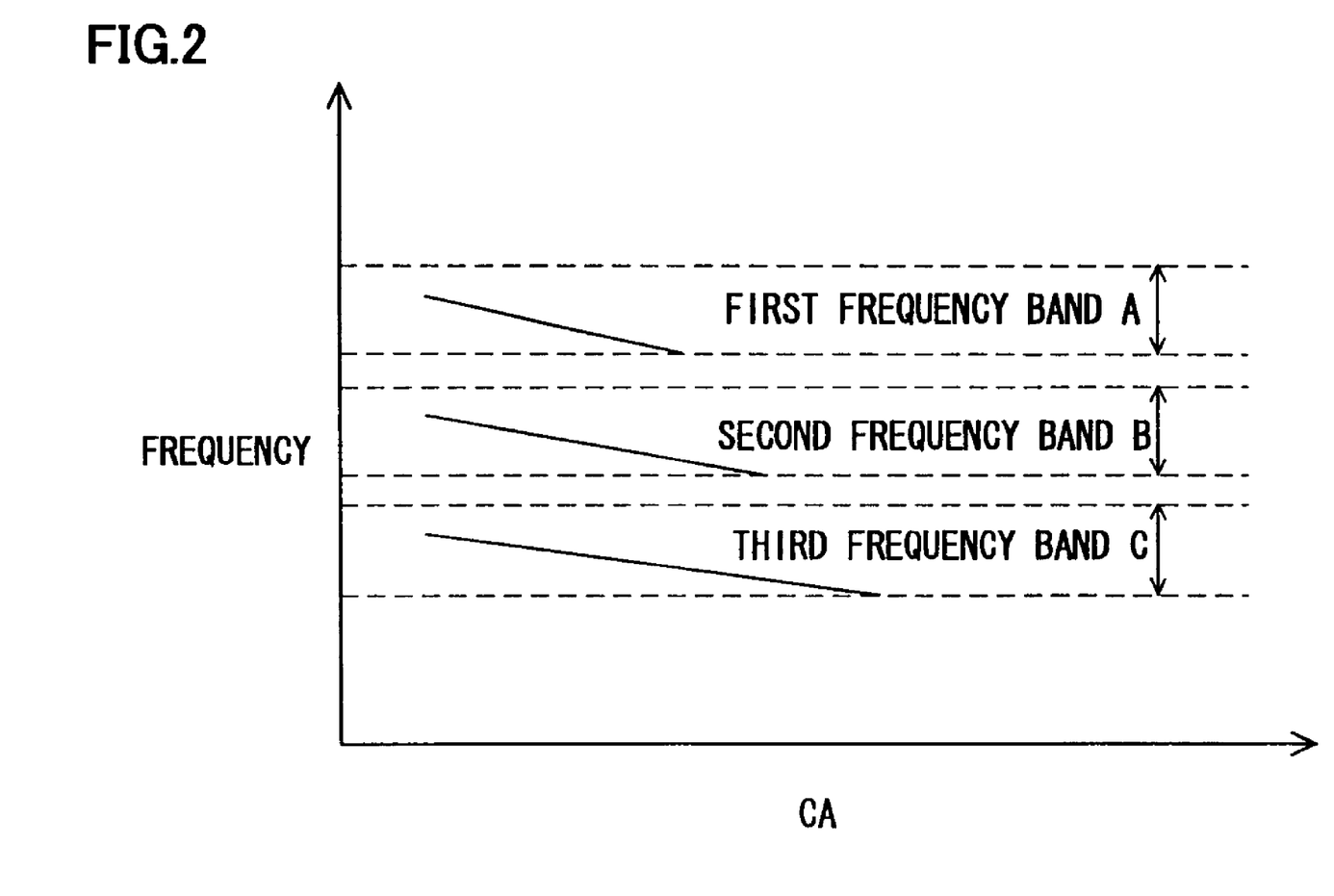
FIG. 2 is a chart showing a frequency band of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the present embodiment, as shown in FIG. 2, vibrations included in a first frequency band A, a second frequency band B, and a third frequency band C, are detected. In FIG. 2, CA designates the crank angle. Note that the number of frequency bands of vibrations generated due to the knocking is not restricted to three.

Figure 3:
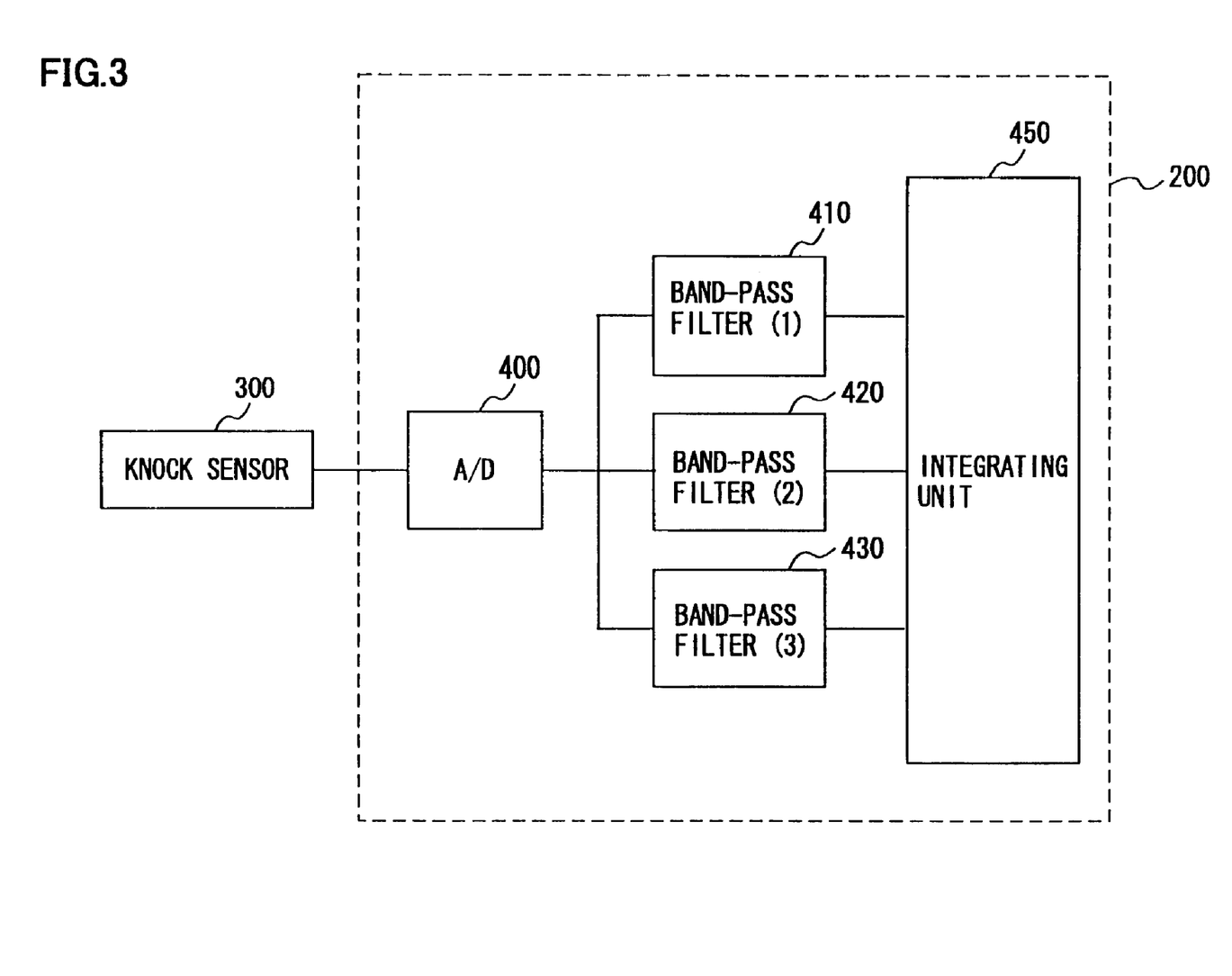
FIG. 3 is a control block diagram showing the engine ECU in FIG. 1.

With reference to FIG. 3, engine ECU 200 will further be described. Engine ECU 200 includes an A/D (analog/digital) converting unit 400, a band-pass filter (1) 410, a band-pass filter (2) 420, a band-pass filter (3) 430, and an integrating unit 450.

A/D converting unit 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating unit 450 integrates signals selected by the band-pass filters (1) 410 to (3) 430, i.e., magnitudes of vibrations, for a crank angle of 5° at a time. The integrated value will hereinafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
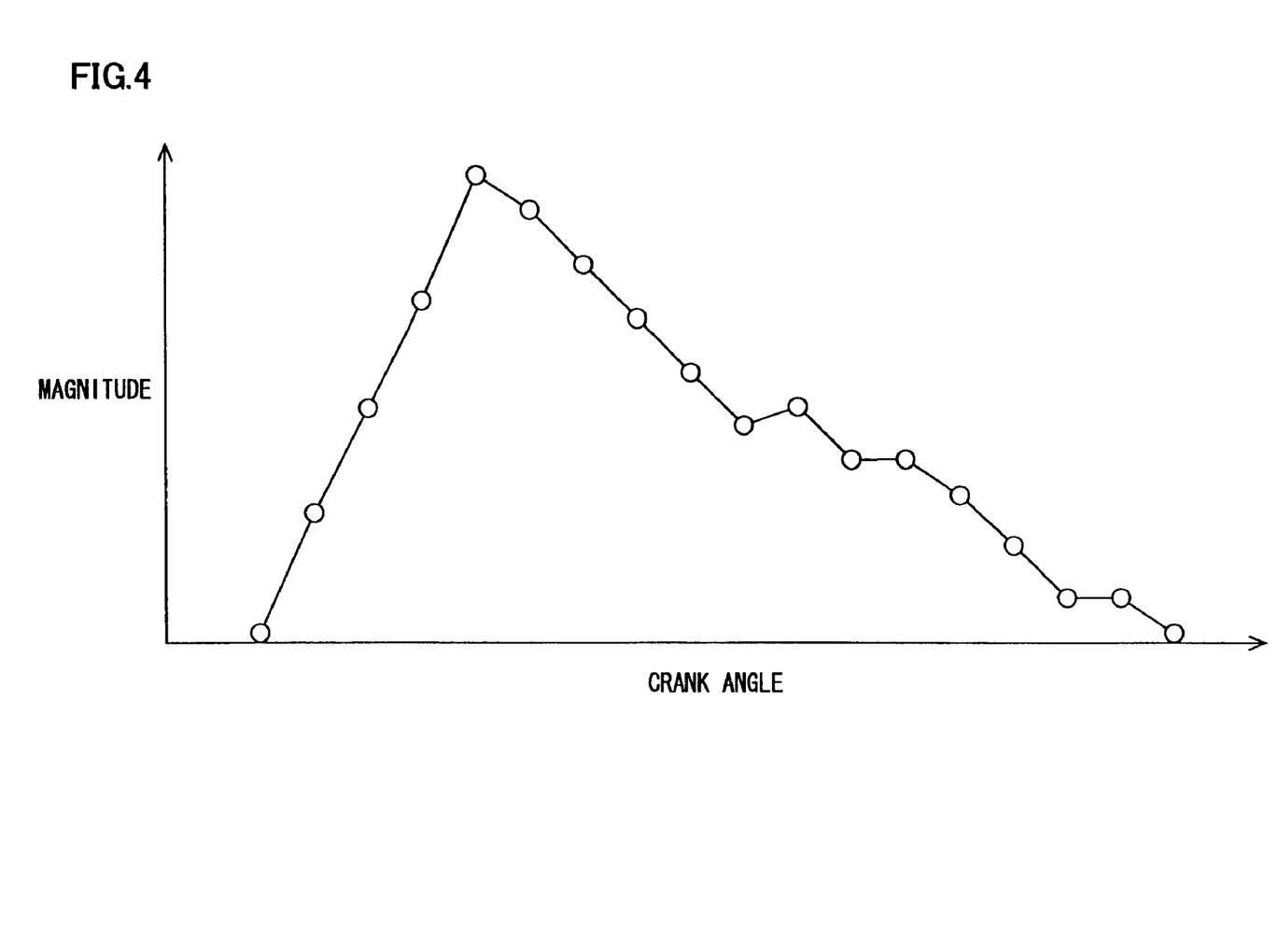
FIG. 4 is a chart showing a waveform of vibration of the engine.

As a result, as shown in FIG. 4, a vibration waveform of engine 100 is detected. In other words, the synthesized waveform of the first to third frequency bands A to C is used as the vibration waveform of engine 100.

Figure 5:
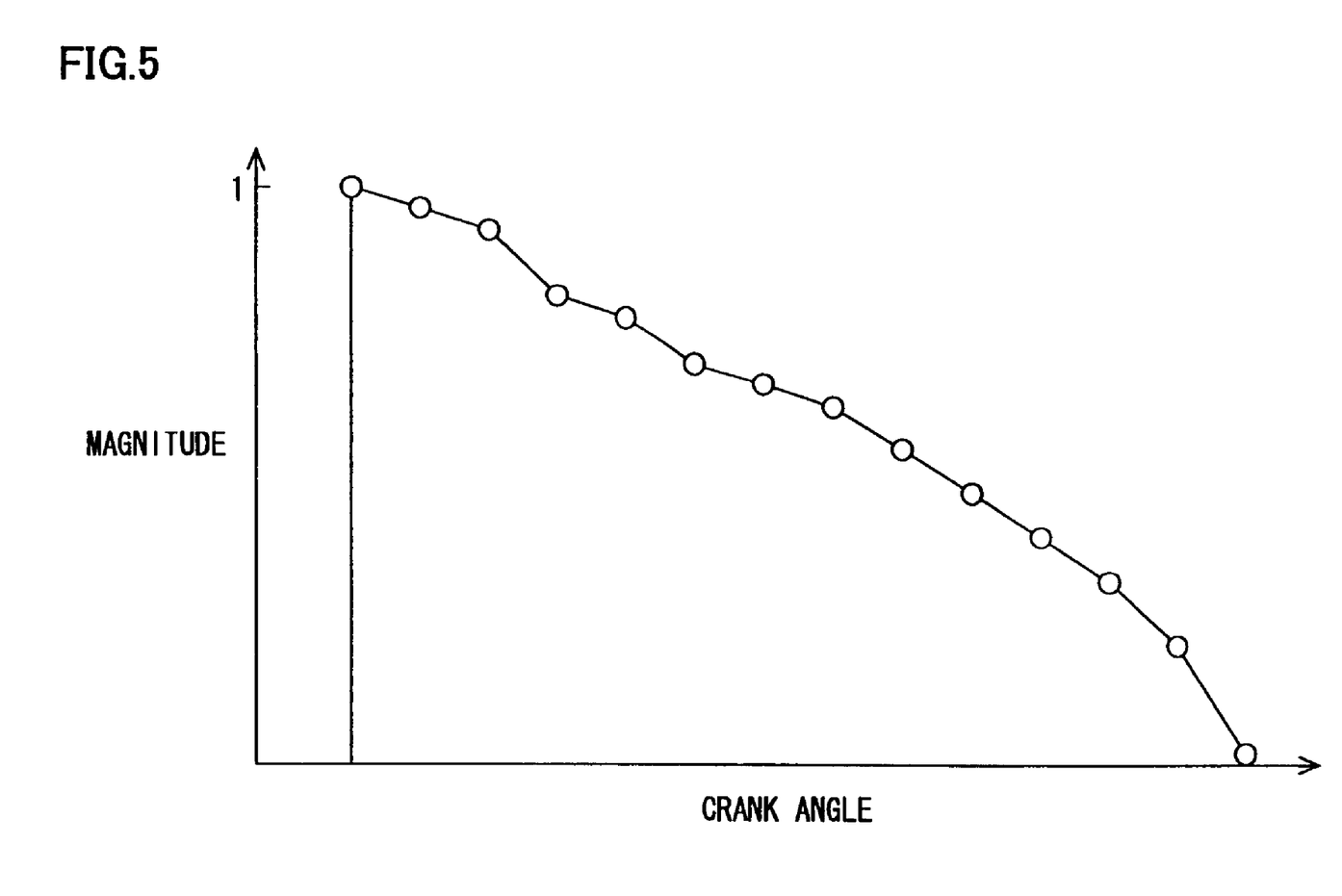
FIG. 5 is a chart showing a knock waveform model stored in ROM of the engine ECU.

The detected vibration waveform is compared with a knock waveform model stored in ROM 202 of engine ECU 200 as shown in FIG. 5. The knock waveform model is formed in advance as a model of a vibration waveform when knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the present embodiment, it is determined that the magnitude of the vibration decreases as the crank angle increases after a peak value of the magnitude of the vibration. However, a crank angle at which the magnitude of the vibration becomes the peak value is not determined.

The knock waveform model in the present embodiment corresponds to the vibration after the peak value of the magnitude of the vibration generated due to the knocking. Note that it is also possible to store a knock waveform model corresponding to vibration after a rising edge of the vibration caused by the knocking.

The knock waveform model is formed and stored in advance based on a vibration waveform of engine 100 detected when knocking is forcibly generated by, for example, experiment.

The knock waveform model is formed by using engine 100 with dimensions of engine 100 and an output value of knock sensor 300 which are median values of dimensional tolerance and output value tolerance of knock sensor 300 (hereinafter referred to as "median characteristic engine"). In other words, the knock waveform model is a vibration waveform in the case where the knocking is forcibly generated in the median characteristic engine. Note that a method of forming the knock waveform model is not limited thereto and the model may also be formed by simulation.

Figure 6:
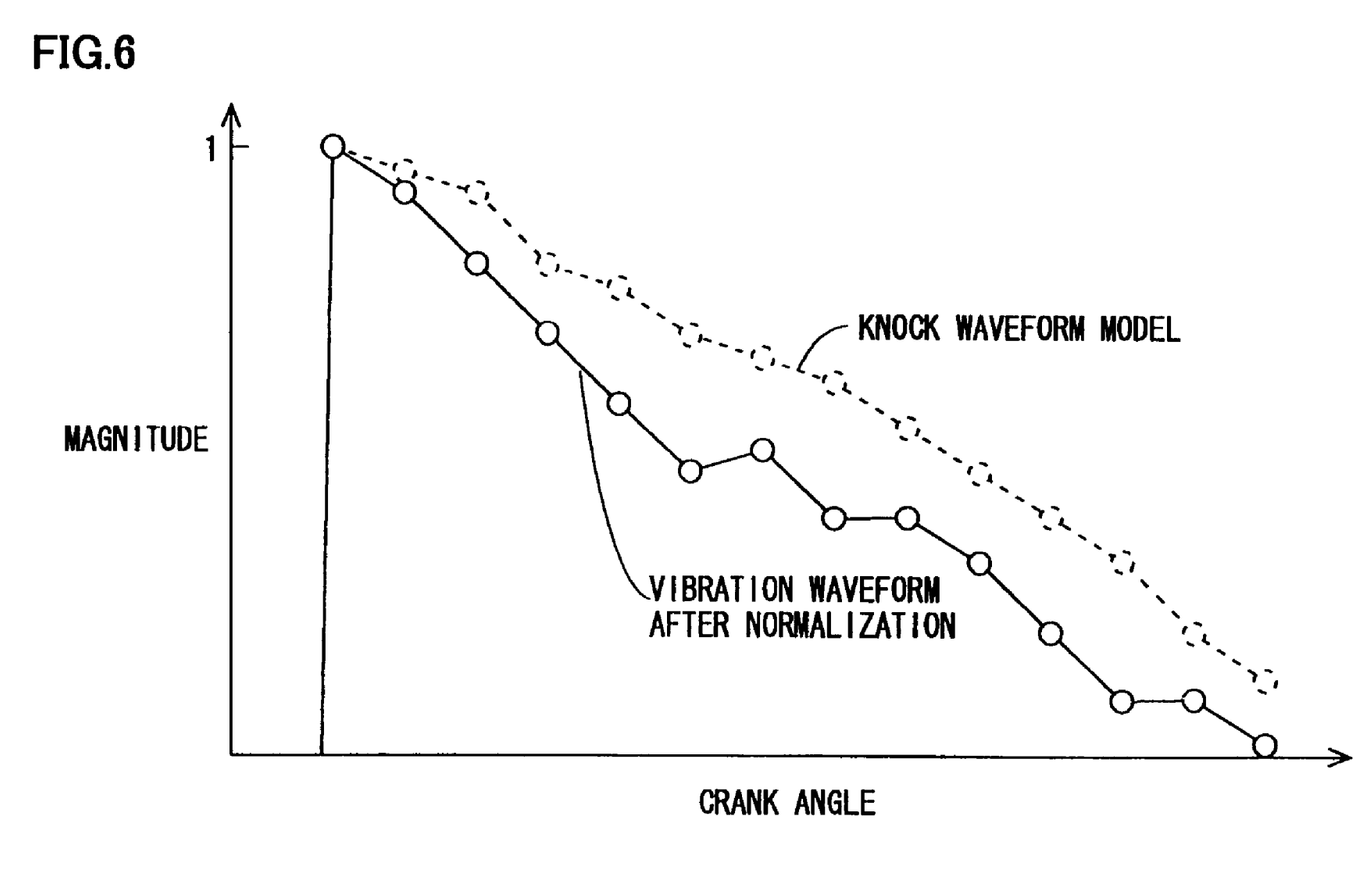
FIG. 6 is a chart for comparing the vibration waveform with the knock waveform model.

In comparison between the detected waveform and the knock waveform model, as shown in FIG. 6, a normalized waveform and the knock waveform model are compared with each other. Here, normalization means to express, for example, the magnitude of the vibration as a dimensionless number in a range of 0 to 1 by dividing each integrated value by a maximum value of the integrated values in the detected vibration waveform. However, a method of normalization is not limited thereto.

In the present embodiment, engine ECU 200 calculates a correlation coefficient K representing a degree of agreement between the normalized vibration waveform and the knock waveform model. With timing at which the magnitude of the vibration becomes a maximum in the vibration waveform after the normalization and timing at which the magnitude of the vibration becomes a maximum in the knock waveform model synchronized, an absolute value (deviation amount) of the deviation of the vibration waveform after the normalization and the knock waveform model from each other is calculated for each crank angle (for every 5° of crank angle) to thereby calculate correlation coefficient K.

If the absolute value of the deviation of the vibration waveform after the normalization and the knock waveform model from each other for each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the present embodiment, the closer a shape of the vibration waveform is to a shape of the knock waveform model, the greater value correlation coefficient K is calculated as. Therefore, if a waveform of vibration caused by factors other than the knocking is included in the vibration waveform, correlation coefficient K is calculated as a small value. Note that a method of calculating correlation coefficient K is not limited thereto.

Furthermore, engine ECU 200 calculates a knock magnitude N representing a magnitude of vibration based on the maximum value (peak value) of the integrated values. If the maximum integrated value is P and a value representing the magnitude of vibration of engine 100 where knocking does not occur is BGL (Back Ground Level), knock magnitude N is calculated by an equation, $N=P/BGL$. BGL is predetermined by simulation or experiment, for example, and stored in ROM 202. Note that a method of calculating knock magnitude N is not limited thereto.

Figure 7:
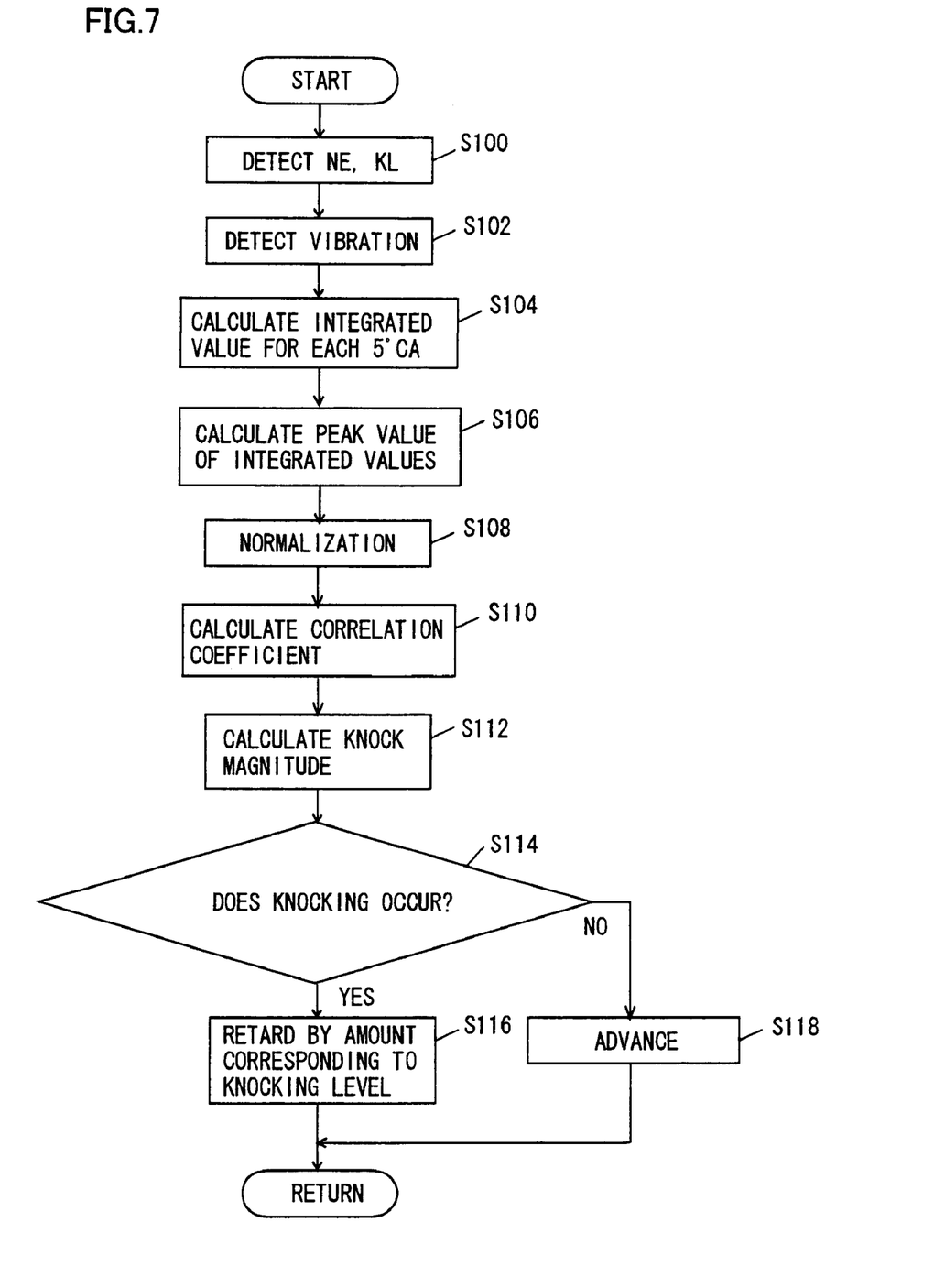
FIG. 7 is a flowchart showing a control structure of a program executed by the engine ECU identified as the device for controlling ignition timing according to the embodiment of the present invention.

With reference to FIG. 7, there will be described a control structure of a program executed by engine ECU 200 identified as the device for controlling ignition timing according to the present embodiment so as to control the ignition timing by determining whether or not knocking has occurred in each ignition cycle.

In step 100 (hereinafter "step" will be abbreviated to "S"), engine ECU 200 detects an engine speed NE based on a signal sent from crank position sensor 306 and detects an intake air amount KE based on a signal sent from air flow meter 314.

In S102, engine ECU 200 detects magnitude of vibration of engine 100 based on a signal sent from knock sensor 300. The magnitude of the vibration is expressed as an output voltage value of knock sensor 300. Note that the magnitude of the vibration may be expressed as a value corresponding to the output voltage value of knock sensor 300. Detection of the magnitude is carried out between the top dead center and 90° (a crank angle of 90°) in a combustion stroke.

In S104, engine ECU 200 calculates a value (integrated value) obtained by integrating output voltage values (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value P) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 synchronizes a crank angle at which peak value P appears and timing at which the magnitude of vibration becomes a maximum in the knock waveform model to thereby calculate correlation coefficient K representing a degree of agreement between the vibration waveform and the knock waveform model.

In S112, engine ECU 200 calculates knock magnitude N by dividing peak value P by BGL.

Figure 8:
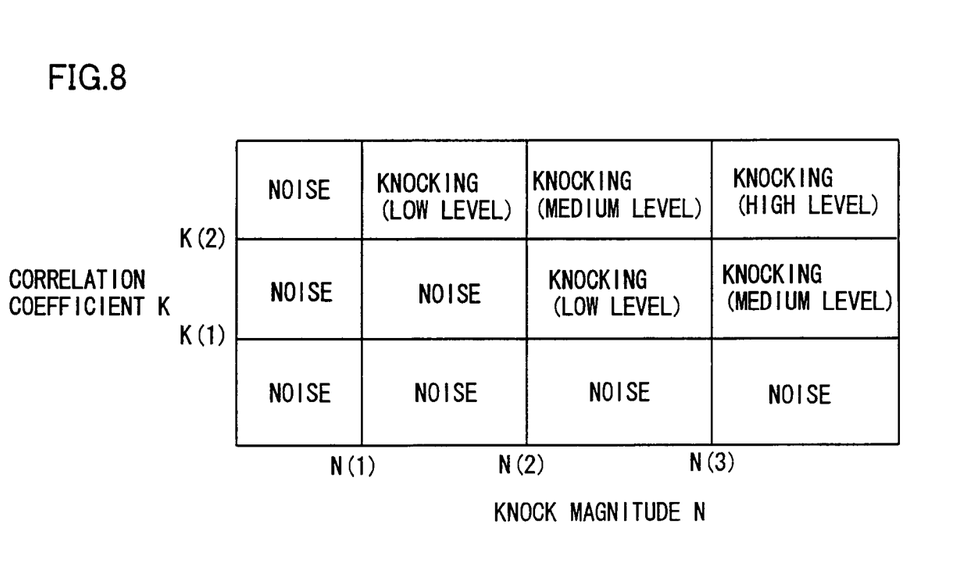
FIG. 8 is a map defining a combination of a correlation coefficient K and a knock magnitude N for determining whether or not knocking has occurred.

In S114, engine ECU 200 determines whether or not knocking has occurred based on a combination of correlation coefficient K and knock magnitude N. Here, as shown in FIG. 8, engine ECU 200 determines whether or not knocking has occurred, according to a map including correlation coefficient K and knock magnitude N as parameters.

According to this map, it is determined that knocking has not occurred in at least one of the case where a condition that correlation coefficient K is smaller than a threshold value K(1) is satisfied, and the case where a condition that knock magnitude N is smaller than a threshold value N(1) is satisfied. In this case, it is determined that noise that is not identified as vibration caused by knocking has been detected.

If it is determined that knocking has occurred, a level of knocking is determined according to a combination of correlation coefficient K and knock magnitude N. The smaller correlation coefficient K is, the lower the knocking level is determined as. The smaller knock magnitude N is, the lower the knocking level is determined as.

Returning to FIG. 7, if it is determined that knocking has occurred (YES in S114), the process proceeds to S116. If not so (NO in S114), the process proceeds to S118.

In S116, engine ECU 200 retards ignition timing such that a retarding amount is smaller as the knocking level becomes lower. In S118, engine ECU 200 advances ignition timing.

Operation of engine ECU 200 identified as the device for controlling ignition timing according to the embodiment based on the above configuration and a flowchart will be described.

During operation of engine 100, engine speed NE is detected based on the signal sent from crank position sensor 306 and intake air amount KL is detected based on the signal sent from air flow meter 314 (S100). Moreover, based on the signal sent from knock sensor 300, magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every 5° is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum in the vibration waveform after the normalization and timing at which the magnitude of the vibration becomes a maximum in the knock waveform model synchronized (see FIG. 6), correlation coefficient K is calculated by $K=(S-\Sigma \Delta S(I))/S$, based on the total of absolute value $\Delta S(I)$ of the deviation of the vibration waveform after the normalization and the knock waveform model from each other for each crank angle, i.e., $\Sigma \Delta S(I)$, and value S obtained by integrating the magnitude of vibration in the knock waveform model by the crank angle (S110).

It is thereby possible to convert the degree of agreement between the detected vibration waveform and the knock waveform model into a number to objectively determine the degree. Furthermore, by comparing the vibration waveform and the knock waveform model with each other, it becomes possible to analyze whether or not the vibration is vibration at the time of knocking from behavior of the vibration such as a damping trend of the vibration.

Furthermore, knock magnitude N is calculated by dividing peak value P by BGL (S112). Thus, it becomes possible to analyze in more detail whether or not the vibration of engine 100 is due to knocking, based on the magnitude of vibration.

Based on the combination of correlation coefficient K and knock magnitude N, it is determined whether or not knocking has occurred (S114). There exits the case where knock magnitude N may be large due to vibration generated by operation of the device such as intake valve 116 or exhaust valve 118, even if a deviation of the vibration waveform and the knock waveform model from each other is large, in other words, even if the vibration waveform is not similar to the knock waveform model and correlation coefficient K is small. Furthermore, there exits the case where large correlation coefficient K is calculated even if knock magnitude N is small, because the shape of the waveform itself is similar to the knock waveform model. In any of these cases, it is concluded that knocking has not occurred.

Accordingly, in the present embodiment, it is determined that knocking has not occurred in at least one of the case where a condition that correlation coefficient K is smaller than threshold value K(1) is satisfied and the case where a condition that knock magnitude N is smaller than threshold value N(1) is satisfied, as shown in the map in FIG. 8 described above (NO in S114). It is thereby possible to reduce erroneous determination that knocking has occurred while knocking has not occurred. If it is determined that knocking has not occurred, ignition timing is advanced (S118). Accordingly, it becomes possible to suppress erroneous retarding of ignition timing while knocking has not occurred.

In contrast, if it is determined that knocking has occurred in the case where correlation coefficient K is larger than threshold value K(1) and knock magnitude N is larger than threshold value N(1) (YES in S114), ignition timing is retarded such that a retarding amount is made smaller as the knocking level becomes lower (S116). It is thereby possible to minutely set a retarding amount of ignition timing according to the knocking level. Accordingly, it becomes possible to suppress significant retarding of ignition timing at a low knocking level. Therefore, excessive retarding of ignition timing can be suppressed.

As described above, by the engine ECU identified as the device for controlling ignition timing according to the present embodiment, it is determined whether or not knocking has occurred based on the combination of correlation coefficient K, which represents a degree of agreement between the vibration waveform and the knock waveform model, and knock magnitude N, which represents magnitude of vibration. It is determined that knocking has not occurred in at least one of the case where a condition that correlation coefficient K is smaller than threshold value K(1) is satisfied and the case where a condition where knock magnitude N is smaller than threshold value N(1) is satisfied. It is thereby possible to reduce erroneous determination that knocking has occurred while knocking has not occurred. Accordingly, it becomes possible to suppress erroneous implementation of ignition timing retard, which should be implemented at the time of knocking. Consequently, excessive retarding of ignition timing can be suppressed. If it is determined that knocking has occurred, ignition timing is retarded such that a retarding amount is made smaller as the knocking level, which is determined based on the combination of correlation coefficient K and knock magnitude N, becomes lower. It is thereby possible to minutely set a retarding amount of ignition timing according to the knocking level. Accordingly, it becomes possible to suppress significant retarding of ignition timing at a low knocking level. Consequently, excessive retarding of ignition timing can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for controlling ignition timing of an internal combustion engine, comprising:

a crank position sensor detecting a crank angle of said internal combustion engine; and an operation unit, wherein said operation unit detects a waveform of vibration of said internal combustion engine in a predetermined range of the crank angle, said operation unit calculates a first value representing a degree of agreement between said detected waveform and a waveform model set as a reference of the waveform of the vibration of said internal combustion engine, said operation unit calculates a second value representing magnitude of the vibration generated in said internal combustion engine, said operation unit determines whether or not knocking has occurred in said internal combustion engine based on a combination of said first value and said second value, in such a manner as to determine that knocking has not occurred in at least one of a case where said first value satisfies a first condition and a case where said second value satisfies a second condition, and if said operation unit determines that knocking has occurred in said internal combustion engine, said operation unit controls said internal combustion engine such that the ignition timing is retarded by an amount corresponding to the combination of said first value and said second value.

2. The device for controlling the ignition timing of the internal combustion engine according to claim 1, wherein said operation unit calculates said second value by dividing a maximum value of the magnitude of the vibration in said predetermined range by a value set as a reference of the magnitude of the vibration of said internal combustion engine.

3. The device for controlling the ignition timing of the internal combustion engine according to claim 1, wherein said first condition is a condition that said first value is smaller than a first threshold value, and said second condition is a condition that said second value is smaller than a second threshold value.

4. The device for controlling the ignition timing of the internal combustion engine according to claim 1, wherein said operation unit controls said internal combustion engine such that the ignition timing is retarded by a smaller amount as said first value becomes smaller.

5. The device for controlling the ignition timing of the internal combustion engine according to claim 1, wherein said operation unit controls said internal combustion engine such that the ignition timing is retarded by a smaller amount as said second value becomes smaller.

6. A method for controlling ignition timing of an internal combustion engine, comprising the steps of:

detecting a crank angle of said internal combustion engine;

detecting a waveform of vibration of said internal combustion engine in a predetermined range of the crank angle;

calculating a first value representing a degree of agreement between said detected waveform and a waveform model set as a reference of the waveform of the vibration of said internal combustion engine;

calculating a second value representing magnitude of the vibration generated in said internal combustion engine;

determining whether or not knocking has occurred in said internal combustion engine based on a combination of said first value and said second value, in such a manner as to determine that knocking has not occurred in at least one of a case where said first value satisfies a first condition and a case where said second value satisfies a second condition; and controlling said internal combustion engine such that the ignition timing is retarded by an amount corresponding to the combination of said first value and said second value, if it is determined that knocking has occurred in said internal combustion engine.

7. The method for controlling the ignition timing of the internal combustion engine according to claim 6, wherein the step of calculating the second value includes the step of calculating said second value by dividing a maximum value of the magnitude of the vibration in said predetermined range by a value set as a reference of the magnitude of the vibration of said internal combustion engine.

8. The method for controlling the ignition timing of the internal combustion engine according to claim 6, wherein said first condition is a condition that said first value is smaller than a first threshold value, and said second condition is a condition that said second value is smaller than a second threshold value.

9. The method for controlling the ignition timing of the internal combustion engine according to claim 6, wherein the step of controlling said internal combustion engine includes the step of controlling said internal combustion engine such that the ignition timing is retarded by a smaller amount as said first value becomes smaller.

10. The method for controlling the ignition timing of the internal combustion engine according to claim 6, wherein the step of controlling said internal combustion engine includes the step of controlling said internal combustion engine such that the ignition timing is retarded by a smaller amount as said second value becomes smaller.

11. A device for controlling ignition timing of an internal combustion engine, comprising:

means for detecting a crank angle of said internal combustion engine;

means for detecting a waveform of vibration of said internal combustion engine in a predetermined range of the crank angle;

means for calculating a first value representing a degree of agreement between said detected waveform and a waveform model set as a reference of the waveform of the vibration of said internal combustion engine;

calculation means for calculating a second value representing magnitude of the vibration generated in said internal combustion engine;

means for determining whether or not knocking has occurred in said internal combustion engine based on a combination of said first value and said second value, in such a manner as to determine that knocking has not occurred in at least one of a case where said first value satisfies a first condition and a case where said second value satisfies a second condition; and control means for controlling said internal combustion engine such that the ignition timing is retarded by an amount corresponding to the combination of said first value and said second value, if it is determined that knocking has occurred in said internal combustion engine.

12. The device for controlling the ignition timing of the internal combustion engine according to claim 11, wherein said calculation means includes means for calculating said second value by dividing a maximum value of the magnitude of the vibration in said predetermined range by a value set as a reference of the magnitude of the vibration of said internal combustion engine.

13. The device for controlling the ignition timing of the internal combustion engine according to claim 11, wherein said first condition is a condition that said first value is smaller than a first threshold value, and said second condition is a condition that said second value is smaller than a second threshold value.

14. The device for controlling the ignition timing of the internal combustion engine according to claim 11, wherein said control means includes means for controlling said internal combustion engine such that the ignition timing is retarded by a smaller amount as said first value becomes smaller.

15. The device for controlling the ignition timing of the internal combustion engine according to claim 11, wherein said control means includes means for controlling said internal combustion engine such that the ignition timing is retarded by a smaller amount as said second value becomes smaller.

* * * * *